(12) United States Patent
Conner et al.

(10) Patent No.: US 12,374,948 B2
(45) Date of Patent: Jul. 29, 2025

(54) METHOD FOR INSERTING A DIAMOND WOUND COIL WINDING INTO A STATOR CORE

(71) Applicant: BorgWarner Inc., Auburn Hills, MI (US)

(72) Inventors: Matthew R. Conner, Mount Carmel, IL (US); Joshua B. Lahrman, New Palestine, IN (US)

(73) Assignee: BORGWARNER INC., Auburn Hills, MI (US)

( * ) Notice: Subject to any disclaimer, the term of this patent is extended or adjusted under 35 U.S.C. 154(b) by 581 days.

(21) Appl. No.: 17/569,925

(22) Filed: Jan. 6, 2022

(65) Prior Publication Data
US 2023/0216362 A1   Jul. 6, 2023

(51) Int. Cl.
| | |
|---|---|
| *H02K 3/12* | (2006.01) |
| *H02K 1/16* | (2006.01) |
| *H02K 3/28* | (2006.01) |
| *H02K 15/043* | (2025.01) |
| *H02K 15/067* | (2025.01) |
| *H02K 15/085* | (2006.01) |

(52) U.S. Cl.
CPC ............ *H02K 3/12* (2013.01); *H02K 1/16* (2013.01); *H02K 3/28* (2013.01); *H02K 15/0431* (2025.01); *H02K 15/067* (2013.01); *H02K 15/085* (2013.01); *Y10T 29/49009* (2015.01)

(58) Field of Classification Search
CPC .......... H02K 3/12; H02K 15/085; H02K 1/16; H02K 15/0056; H02K 15/066; H02K 15/064; H02K 15/04; Y10T 29/49009
USPC ........................... 29/596, 598, 605, 606, 732
See application file for complete search history.

(56) References Cited

U.S. PATENT DOCUMENTS

| | | | |
|---|---|---|---|
| 2009/0121576 A1* | 5/2009 | Even ................... | H02K 15/066 29/596 |
| 2014/0215806 A1* | 8/2014 | Yamaguchi ............. | H02K 3/48 29/736 |
| 2020/0052562 A1 | 2/2020 | Neet | |
| 2020/0161920 A1 | 5/2020 | Neet et al. | |
| 2020/0220404 A1 | 7/2020 | Neet | |

* cited by examiner

*Primary Examiner* — Thiem D Phan
(74) *Attorney, Agent, or Firm* — CANTOR COLBURN LLP

(57) ABSTRACT

A method of forming a diamond coil wound stator winding including introducing a plurality of diamond coils into a plurality of slots of a linear magazine forming a diamond coil wound stator winding, transferring the diamond coil wound stator winding into a circular cassette, and shifting the diamond coil wound stator winding from the circular cassette into a plurality of slots arranged in an inner annular surface of a stator core in a single operation.

5 Claims, 6 Drawing Sheets

METHOD FOR INSERTING A DIAMOND WOUND COIL WINDING INTO A STATOR CORE

BACKGROUND OF THE INVENTION

Exemplary embodiments pertain to the art of electric machines and, more particularly, to a system and method for inserting a diamond wound coil winding into a stator of an electric machine.

Many electrical machines, such as alternating current electric motors or generators, include a stator assembly and a rotor assembly arranged in a housing. The stator assembly is mounted to the housing and includes a generally cylindrical stator core provided with a plurality of slots. Conductors or stator windings are fitted into the plurality of slots in a predetermined pattern. The stator windings are formed of slot segments that are located in select ones of the plurality of slots to form a multi-phase winding pattern and end loop segments that connect between adjacent slot segments. The rotor assembly includes a rotor attached to a shaft that is rotatably mounted to the housing coaxially with the stator core. The rotor is rotated within the stator core to develop an electrical current.

Inserting the stator windings into the plurality of slots is a complex task. In some arrangements, a winding needle lays a wire into one of the plurality of slots, advances and lays the wire into another of the plurality of slots. This process continues until the stator core is wound and each of the plurality of slots is filled. In other arrangements, a wire is pre-formed with slot segments interconnected by end loops. The slot segments are spaced so as to be inserted into select ones of the plurality of slots in a predetermined pattern. The wire is then loaded directly into the stator core with the slot segments being inserted into the select ones of the plurality of slots.

In certain winding designs, commonly known as lap or diamond coil winding, one coil of which is shown at 2 in FIG. 1, one leg 4 of the winding is arranged radially outwardly of another leg 6 of each coil 2 of the winding. When inserted, often times the portion of the winding that is designed to be radially outward ends up on an inner layer. To allow insertion of the final few coils, a portion 7 of a winding 8 must be removed as shown in FIG. 2. Once removed, the winding may be properly repositioned/configured and any missing winding lap coils are inserted by hand. Removing diamond coils, reconfiguring the winding, and then re-inserting the diamond coils adds to an already complex process, and increases manufacturing time takes time. Accordingly, the industry would welcome a system and method for inserting a diamond would coil into a stator that did not require the manual removal and reinsertion of diamond coils.

BRIEF DESCRIPTION OF THE INVENTION

Disclosed is a method of forming a diamond coil wound stator winding including introducing a plurality of diamond coils into a plurality of slots of a linear magazine forming a diamond coil wound stator winding, transferring the diamond coil wound stator winding into a circular cassette, and shifting the diamond coil wound stator winding from the circular cassette into a plurality of slots arranged in an inner annular surface of a stator core in a single operation.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
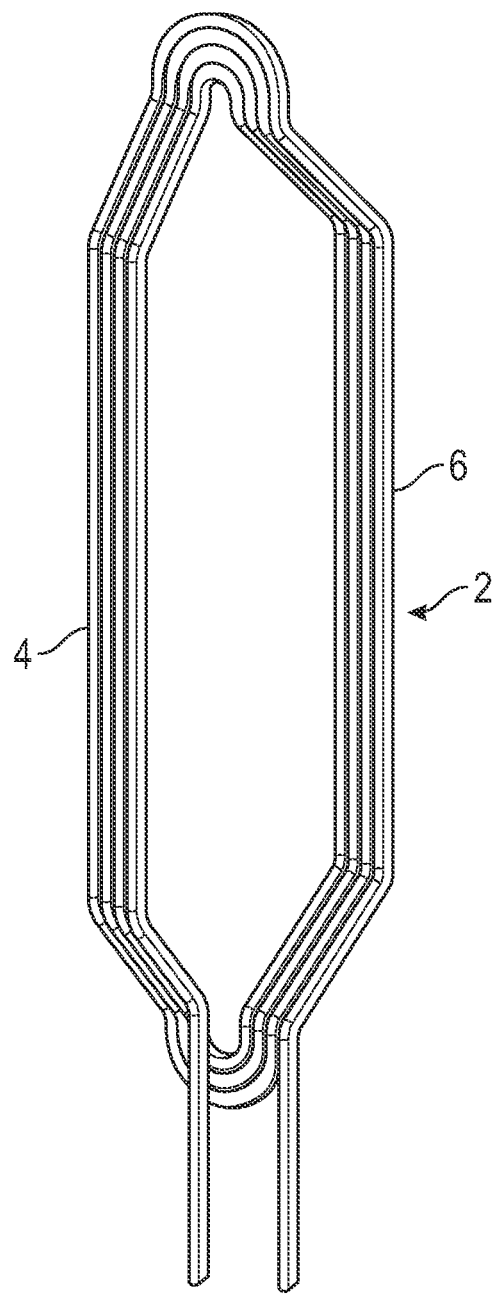
FIG. 1 depicts a coil of a diamond wound stator winding in accordance with the prior art.
Figure 2:
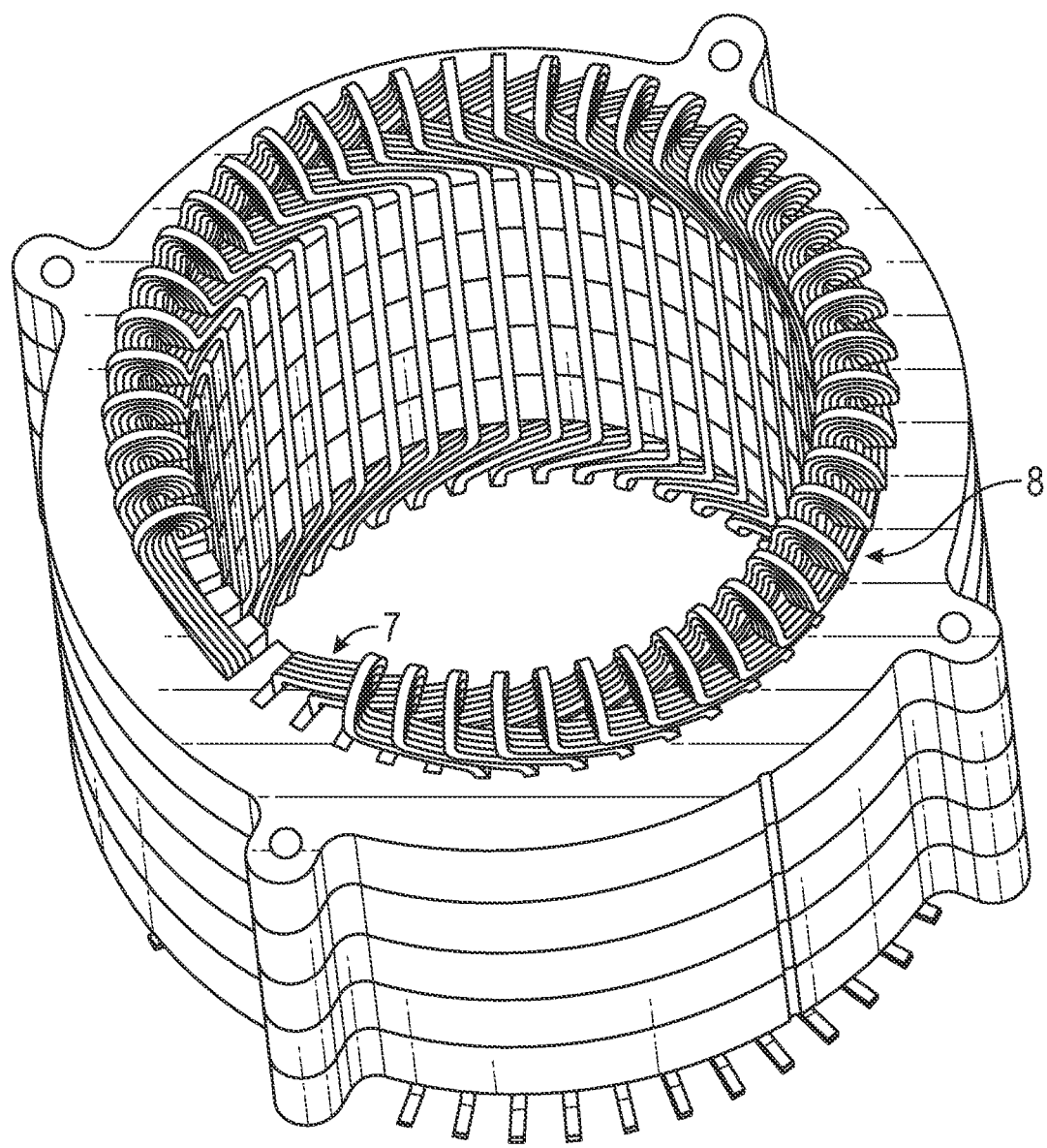
FIG. 2 depicts a stator core wound in accordance with the prior art.
Figure 3:
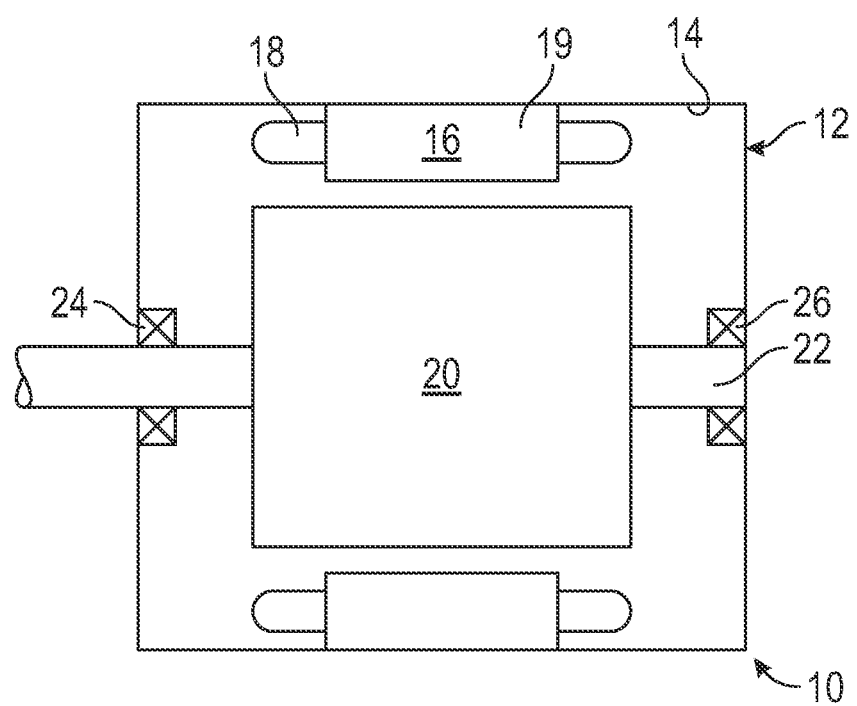
FIG. 3 depicts an electric machine having a diamond wound winding inserted into a stator, in accordance with a non-limiting example.
Figure 6:
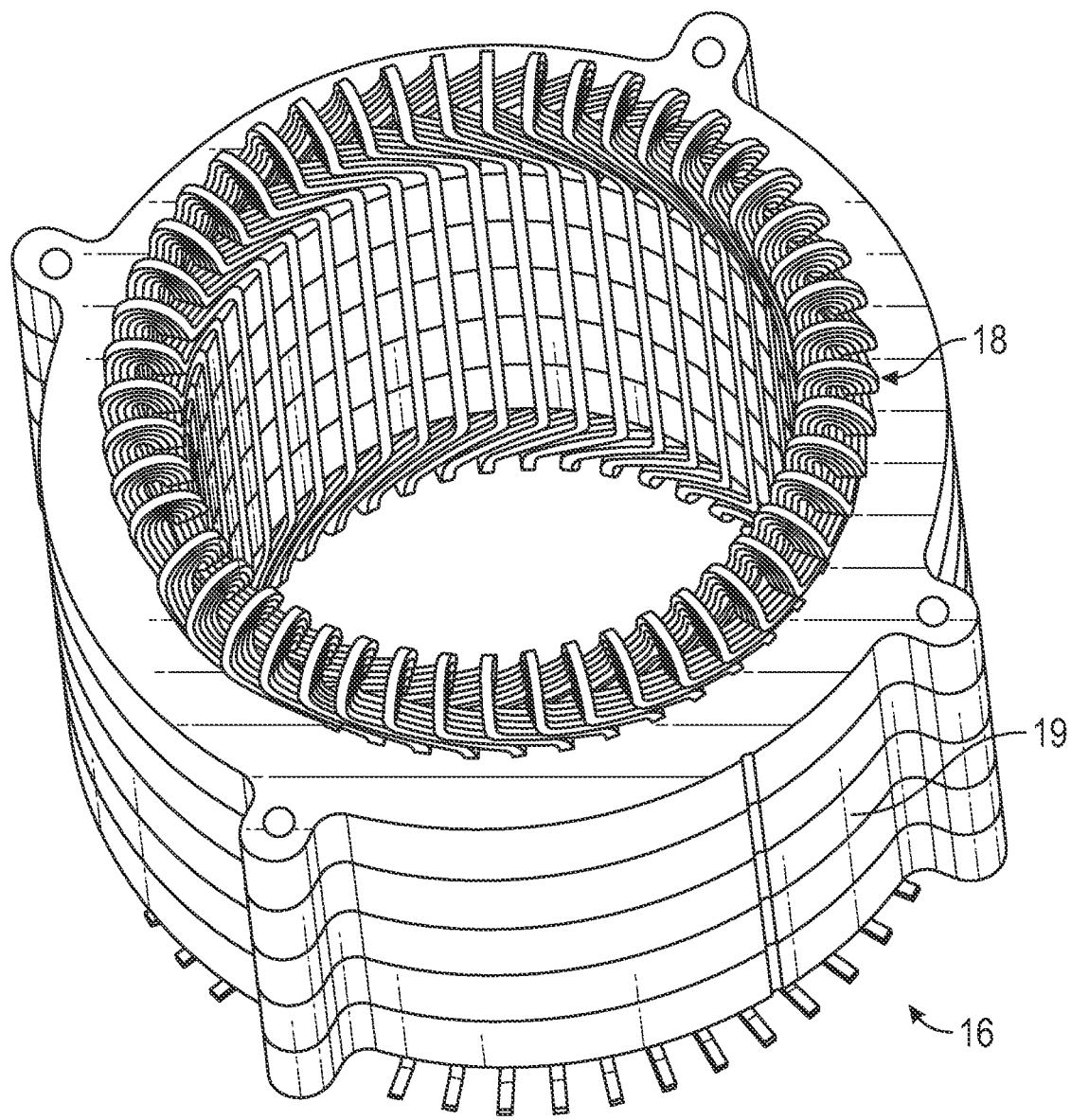
FIG. 6 depicts a stator core loaded with a diamond wound coil from the cassette of FIG. 5, in accordance with a non-limiting example.

An electric machine, in accordance with a non-limiting example, is indicated generally at 10 in FIG. 3. Electric machine 10 includes a housing 12 having an inner surface 14. A stator 16 is supported by inner surface 14. Stator 16 includes a diamond wound stator winding 18 supported by a core 19 (FIG. 6). A rotor 20 is arranged radially inwardly of stator 16. Rotor 20 is supported on a shaft 22 which, in turn, is supported by a first bearing 24 and a second bearing 26 mounted to housing 12. As will be discussed herein, diamond wound winding 18 is loaded into core 19 in a single action. That is, a complete diamond wound stator winding 18 is loaded into core 19 without the need for additional manipulation such as removing and/or repositioning winding lap coils.

Figure 4:
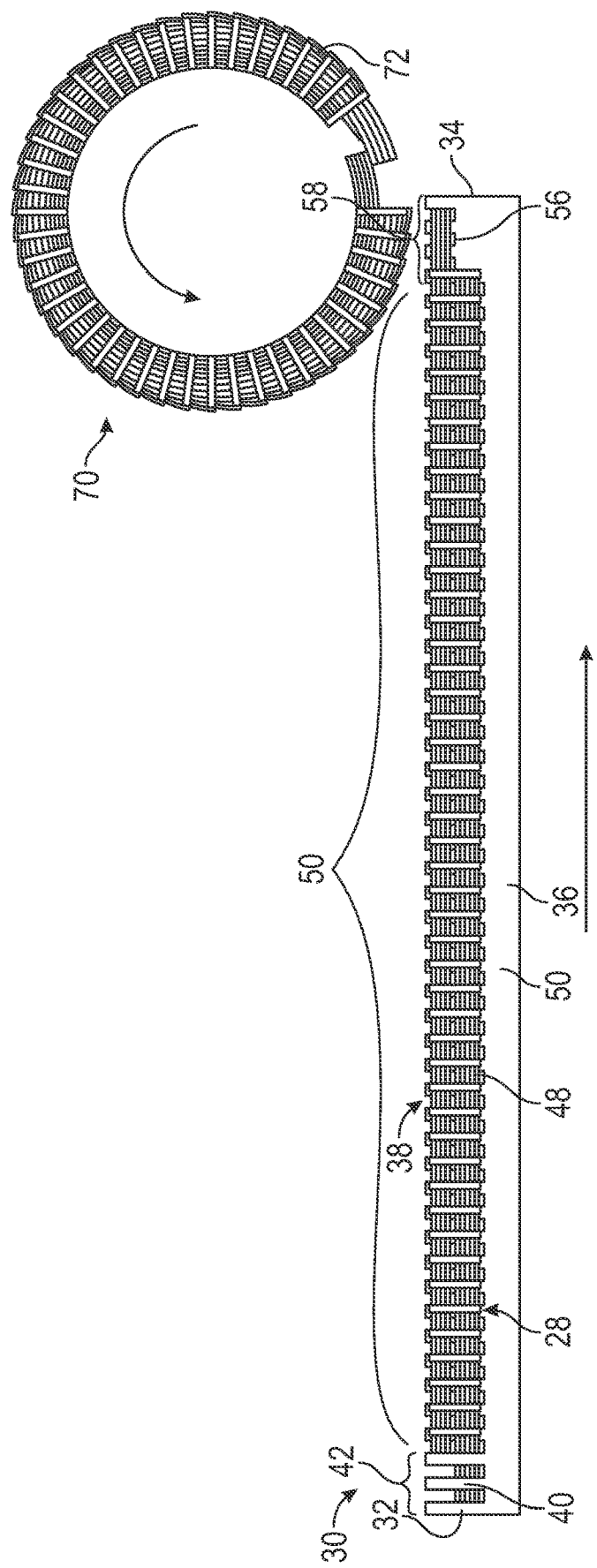
FIG. 4 depicts a side view of a linear track and cassette for preparing a diamond wound winding for a stator, in accordance with a non-limiting example.
Figure 5:
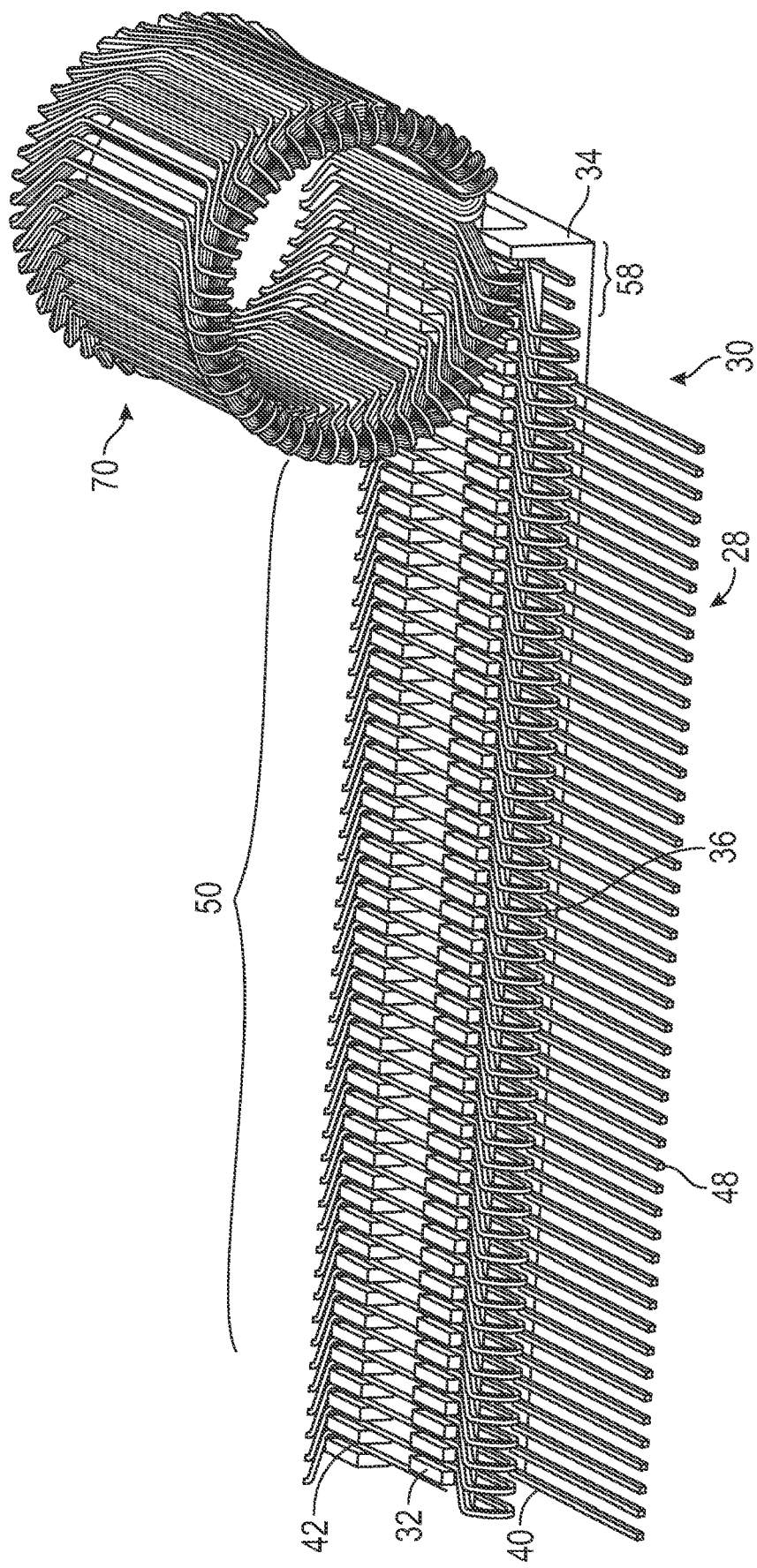
FIG. 5 is a perspective view of the linear track and cassette of FIG. 4, in accordance with a non-limiting example.

Reference will now follow to FIGS. 4 and 5 in describing a system for mounting diamond wound stator winding 18 into core 19 in accordance with a non-limiting example. Initially, a plurality of diamond coils 28 are inserted into a linear magazine 30. Each diamond coil 28 includes a pair of winding lap coils (not separately labeled). In a non-limiting example, linear magazine 30 includes a first end 32, a second end 34, and an intermediate portion 36 that extends between first end 32 and second end 34. A plurality of slots indicated generally at 38 are formed in intermediate portion 36. In a non-limiting example, the plurality of slots 38 may vary in number depending upon electrical characteristics of stator 16. In a non-limiting example, the plurality of slots equals the number of slots in core 19 plus the number of phases In a non-limiting example, a first plurality 40 of diamond coils 28 is installed into each of the plurality of slots 38 at a first portion 42 of the linear magazine 30. The first portion 42 of the linear magazine 30 is defined at first end 32. A second plurality 48 of diamond coils 28 is installed into each of the plurality of slots 38 at a second portion 50 of linear magazine 30. Second portion 50 of linear magazine 30 is defined by intermediate portion 36. A third plurality 56 of diamond coils 28 is deposited into each of the plurality of slots 38 at a third portion 58 of linear magazine 30. Third portion 58 of the linear magazine 30 is defined at second end 34.

In a non-limiting example, diamond wound stator winding 18 is formed in linear magazine 30 starting at third portion 58 with radially inwardly positioned diamond coils 28. Additional diamond coils 28 being filled into slots 38 terminating at first end 34 with radially outwardly positioned ones of diamond coils 28. Additional diamond coils 28 are introduced into slots 38 until diamond wound stator winding 18 is formed. In a non-limiting example, first plurality 40 of diamond coils 28 is defined by a first number of conductors representing radially outwardly facing diamond coils 28, second plurality 48 of diamond coils 28 is defined by a second number of conductors, and third plurality 56 of diamond coils 28 is defined by a third number of conductors representing radially inwardly facing diamond coils 28.

DETAILED DESCRIPTION

In a non-limiting example, the second number of conductors is greater than each of the first number of conductors and the second-third number of conductors. In another non-limiting example, the first number of conductors and the third number of conductors, represent half-filled slots 38 such that when combined, the number of diamond coils are equal to the second number of conductors. When loaded into linear magazine 30, the plurality of diamond coils 28 are nested together.

In a non-limiting example, diamond coils 28 are transferred from linear magazine 30 to a cassette 70. In a non-limiting example, cassette 70 is substantially circular. As shown in FIG. 4, cassette 70 includes a plurality of slot elements 72 that correspond to the number of slots in core 19. In a non-limiting example, cassette 70 is rotated about a first axis and linear magazine 30 is shifted along a second axis that is substantially parallel to the first axis or tangential to an outer diameter of the cassette 70. Diamond coils 28 are loaded into cassette 70 starting with the third plurality of diamond coils 56. As linear magazine 30 moves, diamond coils 28 are loaded into cassette 70. In a non-limiting example, diamond coils 28 are passed from linear magazine into cassette 70 during a single rotation about the first axis.

Once diamond wound stator winding 18 is passed into slot elements 72, cassette 70 is arranged within core 19. Diamond wound stator winding 18 is then moved radially outwardly from cassette 70 and transferred into core 19 in a single radial outward motion starting with the third plurality of diamond coils 56. Once loaded into core 19, no additional manipulation, other than making selected electrical connections between phases, is needed as diamond wound stator winding 18 is completely and entirely formed in linear magazine 30 and maintained by cassette 70. For example, after transferring diamond wound stator winding 18 from cassette 70 into core 19, diamond coils 28 may be connected in, for example, a delta or a wye connection depending on requirements of electric machine 10.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method of forming a diamond coil wound stator winding comprising:
    introducing a plurality of diamond coils into a plurality of slots of a linear magazine forming a diamond coil wound stator winding beginning with a radially inwardly positioned portion of the diamond coils and ending with a radially outwardly positioned portion of the diamond coils;
    transferring the diamond coil wound stator winding into a circular cassette starting from an end of the linear magazine having only the radially inwardly positioned portion of the diamond coils and ending with only the radially outwardly positioned portion of the diamond coils; and
    shifting the diamond coil wound stator winding from the circular cassette into a plurality of slots arranged in an inner annular surface of a stator core in a single operation.

2. The method of claim 1, wherein transferring the diamond wound winding into the circular cassette includes rotating the circular cassette relative to the linear magazine.

3. The method of claim 2, wherein rotating the circular cassette relative to the linear magazine includes spinning the circular cassette about a first axis and shifting the linear magazine along a second axis that is substantially perpendicular to the first axis.

4. The method of claim 2, wherein transferring the diamond wound winding into the circular cassette includes loading a complete diamond wound winding into the circular cassette.

5. The method of claim 4, wherein loading the complete diamond wound winding includes transferring the complete diamond wound winding from the linear magazine into the circular magazine during a single circular cassette rotation.

* * * * *